United States Patent
Okusako

(10) Patent No.: US 6,752,973 B2
(45) Date of Patent: Jun. 22, 2004

(54) PROCESS FOR PRODUCING TITANIUM OXIDE

(75) Inventor: Kensen Okusako, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 80 days.

(21) Appl. No.: 09/940,479

(22) Filed: Aug. 29, 2001

(65) Prior Publication Data

US 2002/0051746 A1 May 2, 2002

(30) Foreign Application Priority Data

Sep. 14, 2000 (JP) ........................................ 2000-279500

(51) Int. Cl.$^7$ ............................................. C01G 23/00
(52) U.S. Cl. ..................... 423/81; 423/610; 423/609; 423/611; 423/612; 423/615; 423/616
(58) Field of Search ................................ 423/609, 610, 423/611, 612, 615, 616, 81, 85

(56) References Cited

U.S. PATENT DOCUMENTS

| | | | |
|---|---|---|---|
| 5,011,674 A | | 4/1991 | Yoshimoto et al. |
| 5,061,460 A | * | 10/1991 | Watanabe et al. ........... 423/610 |
| 5,149,519 A | * | 9/1992 | Chopin et al. ............... 423/610 |
| 5,863,514 A | * | 1/1999 | Sasaki et al. ................ 423/610 |

FOREIGN PATENT DOCUMENTS

| | | |
|---|---|---|
| EP | 1 065 169 A1 | 1/2001 |
| EP | 1 095 908 | 5/2001 |
| EP | 1 125 636 A1 | 8/2001 |
| GB | 427 339 A | 4/1995 |
| JP | 10-087345 A | 7/1998 |
| JP | 2000-140636 | 5/2000 |

OTHER PUBLICATIONS

Computer translation of Japan, 10–087345, published Jul. 31, 1998.*

S. Sato, "Photocatalytic Activity on NO–DOPED $TiO_2$ In The Visible Light Region", Chemical Physics Letter, vol. 123, No. 1,2, (Jan. 3, 1986), pp. 126–128.

E. Kanezaki et al., "Solid–State Chemistry of Thermally Induced Yellow Colouring in Synthetic Hydrous Titanium Oxide from $TiCl_3$", J. Chem. Soc. Faraday Trans., 88(24), (1992), pp. 3583–3586, no month.

* cited by examiner

Primary Examiner—Steven Bos
(74) Attorney, Agent, or Firm—Sughrue Mion, PLLC

(57) ABSTRACT

A process for producing a titanium oxide is provided which comprises the steps of (i) mixing an acidic solution of a titanium compound with a nitrogen-containing basic organic compound to obtain a reaction product and (ii) calcining the obtained product. The titanium oxide exhibits a high photocatalytic activity by visible light radiation.

11 Claims, No Drawings

PROCESS FOR PRODUCING TITANIUM OXIDE

FIELD OF THE INVENTION

The present invention relates to a process for producing a titanium oxide. Specifically, the present invention relates to a process for producing a titanium oxide suitable for a photocatalyst.

BACKGROUND OF THE INVENTION

It has been investigated that malodorous substances in air, or organic solvents or surfactants in water are decomposed and removed by a photocatalytic activity shown by titanium oxide. Recently, a decomposition and removal method using visible light as a light source has been studied owing to the wide usability and the convenience, and a titanium oxide exhibiting a high photocatalytic activity by irradiation of visible light has been developed.

Such a titanium oxide can be produced, for example, in an ion implantation method in which vanadium or chromium is introduced into titanium oxide. However, the ion implantation method needs a specific apparatus equipped with a vacuum container. In addition, there are problems in scaling up of the production apparatus or mass production thereof and, therefore, the production cost tends to be high.

SUMMARY AND OBJECTS OF THE INVENTION

One object of the present invention is to provide a process for easily producing a titanium oxide showing a high photocatalytic activity by visible light radiation without using a specific apparatus equipped with a vacuum container or the like.

This object and other objects are achieved by the present invention which provides a process for producing a titanium oxide. The process includes the steps of (i) mixing an acidic solution of a titanium compound with a nitrogen-containing basic organic compound to obtain a reaction product and (ii) calcining the obtained product.

DETAILED DESCRIPTION OF THE INVENTION

A titanium oxide in the present invention is produced in a process which comprises the steps of (i) mixing an acidic solution of a titanium compound with a nitrogen-containing basic organic compound to obtain a reaction product and (ii) calcining the obtained product.

Examples of the acidic solution of a titanium compound include an aqueous solution of titanium trichloride ($TiCl_3$), titanium tetrachloride ($TiCl_4$), titanium sulfate [$Ti(SO_4)_2 \cdot mH_2O$, $0 \leq m \leq 20$], titanium oxysulfate [$TiOSO_4 \cdot nH_2O$, $0 \leq n \leq 20$], titanium oxychloride ($TiOCl_2$) and the like. The acidic solution of a titanium compound may be prepared in a suitable known method such that a titanium compound is dissolved in water, or that a titanium oxide or a titanium hydroxide is dissolved in a mineral acid such as sulfuric acid and hydrochloric acid. The content of titanium compound in the acidic solution may be about 1% by weight to about 40% by weight in terms of titanium atom.

In the present invention, the nitrogen-containing basic organic compound to be mixed with the above-described acidic solution of a titanium compound may be a compound containing nitrogen atom in its molecule and having basic properties. Examples of the nitrogen-containing basic organic compound include amines such as an acyclic amine, an alicyclic amine and an aromatic amine. The nitrogen-containing basic organic compound may be used singly or in the combination of two or more of them.

The acyclic amine which may be used in the present invention is a compound having at least one amino group in its molecule. Examples thereof include primary monoamines which have a chemical formula $CnH_{2n+1}NH_2$ wherein n represents an integer of from 1 to 10, primary diamines which have a chemical formula of $H_2NC_nH_{2n}NH_2$ wherein n represents an integer of from 1 to 10, dialkylamines having 2 to 10 carbon atoms, trialkylamines having 3 to 10 carbon atoms and the like. More specifically, examples of the acrylic amine include methylamine, ethylamine, n-propylamine, n-butylamine, iso-propylamine, sec-butylamine, ethylenediamine, 1,3-propanediamine, 1,2-propanediamine, dimethylamine, diethylamine, trimethylamine, triethylamine and the like.

The alicyclic amine which may be used in the present invention is a compound having at least one amino group, wherein the amino group is directly connected with a carbon atom of the aliphatic ring of the amine, or an aliphatic, heterocyclic compound having at least one nitrogen atom in the aliphatic ring. The alicyclic amine may have a heteroatom such as oxygen atom and sulfur atom in the aliphatic ring. Also, the alicyclic amine may have an aliphatic hydrocarbon group, alicyclic hydrocarbon group, an aromatic hydrocarbon group, an acyl group or the like, or additionally have a substituent such as an amino group through the above-described group. More specifically, examples of the alicyclic amine include cyclohexylamine, cyclohexanediamine, pyrrolidine, piperidine, pipecoline, piperazine, N-methylpiperazine, N-ethylpiperazine, N-propylpiperazine and the like.

The aromatic amine which may be used in the present invention is a compound having at least one amino group, wherein the amino group is directly connected with a carbon atom of the aromatic ring, or an aromatic, heterocyclic compound having at least one nitrogen atom in the aromatic ring. The aromatic amine may have a heteroatom such as oxygen atom and sulfur atom in the aromatic ring. Also, the aromatic amine may have an aliphatic hydrocarbon group, alicyclic hydrocarbon group, an aromatic hydrocarbon group, an acyl group or the like, or additionally have a substituent such as an amino group through the above-described group. More specifically, examples of the aromatic amine include aniline, phenylenediamine, pyridine, pyrimidine, 4-aminopyridine, melamine and the like.

The mixing of an acidic solution of a titanium compound with a nitrogen-containing basic organic compound may be conducted in any suitable method. For example, the nitrogen-containing basic organic compound is added into the acidic solution of the titanium compound, or the acidic solution of the titanium compound is added into the nitrogen-containing basic organic compound. The mixing is preferably conducted at a low temperature. The temperature may be about 60° C. or lower, preferably about 40° C. or lower and more preferably about 10° C. or lower.

The ratio of the nitrogen-containing basic organic compound to the acidic solution of the titanium compound may be about 0.5 time or more, preferably about 0.8 time or more, and about 10 times or less, preferably about 3 times or less, in terms of the base equivalent of the nitrogen-containing basic organic compound based on the acid equivalent of the acidic solution of the titanium compound. The acid equivalent is the molar amount multiplied by the valence of acid groups contained in the acidic solution of the titanium. The base equivalent is the molar amount of basic nitrogen atom contained in the nitrogen-containing basic organic compound. For example, the basic equivalent of a monoamine is one equivalent per one mole thereof whatever the monoamine (such as a primary, secondary or thirdly amine) is. The basic equivalent of a diamine is 2 equivalent per one mole thereof.

The resulting product thus obtained by the mixing of the acidic solution of the titanium compound with the nitrogen-containing basic organic compound is then calcined. The calcination is preferably carried out in the atmosphere having an oxygen content of from about 1% by volume to about 10% by volume. For example, the calcination is preferably carried out in a mixed gas of oxygen and nitrogen or a mixed gas of air and an inert gas such as nitrogen, each mixed gas having a prescribed content of oxygen. Although not outside the scope of the present invention, when the calcination is carried out in the atmosphere having an oxygen content of more than about 10% by volume, the photoactivity of the obtained titanium oxide may be decreased. Also again while not outside the scope of the present invention, when the calcination is carried out in the atmosphere having a oxygen content of less than about 1% by volume, the photoactivity of the obtained titanium oxide may be decreased. The temperature of the calcination may be about 300° C. or higher, and be preferably from about 350° C. to about 600° C.

In the present invention, a particulate titanium oxide may be produced. The particulate titanium oxide can be used as a photocatalyst as it is. Alternatively, the particulate titanium oxide may be mixed with a suitable bonding agent and then be molded to be utilized as the molding article thereof. Also, the particulate titanium oxide may be utilized for being applied onto a variety of construction materials, automobile materials or the like, or for coating such materials. In the applying or coating, the particulate titanium oxide may be used in a coating agent which is obtained by dispersing the titanium oxide in a solvent such as water, alcohols and ketones, or by peptizing the titanium oxide with an acid.

The titanium oxide of the present invention may be used as a photocatalyst, for example, as follows:

The titanium oxide may be put in a visible-light-transmitting glass tube or container together with a liquid or gas to be treated, and then be irradiated with visible light having a wavelength of 430 nm or more using a light source. In the irradiation of visible light to the titanium oxide, the liquid or gas in the tube or container may be oxidized, reduced or decomposed. Irradiation time of light may be determined depending on light intensity of the light source, and the kind and amount of the liquid or gas to be treated. The light source is not particularly limited as long as it can emit visible light having a wavelength of 430 nm or more. Example of the light source include solar rays, a fluorescent lamp, a halogen lamp, a black light, a xenon lamp, a mercury arc lamp and a sodium lamp. The light source may be equipped with an ultraviolet-cutting filter and/or an infrared-cutting filter, if necessary.

As described above, in accordance with the present invention, the titanium oxide exhibiting a high photocatalytic activity with radiation of visible light can be easily produced.

The process for producing titanium oxide of the present invention is described in Japanese application no. 2000-279500, filed on Sep. 14, 2000, the complete disclosures of which are incorporated herein by reference.

Also, the invention being thus described, it will be apparent that the same may be varied in many ways. Such variations are to be regarded as within the spirit and scope of the invention, and all such modifications as would be apparent to one skilled in the art are intended to be within the scope of the following claims.

EXAMPLES

The present invention is described in more detail by following Examples, which should not be construed as a limitation upon the scope of the present invention.

The catalytic activity of the obtained titanium oxide was evaluated as follows:

In a sealed-type glass reaction vessel (diameter: 8 cm, height: 10 cm, volume: about 0.5 L), was placed a 5-cm diameter glass Petri dish on which 0.3 g of a titanium oxide to be evaluated. The reaction vessel was filled with a mixed gas having 20% by volume of oxygen and 80% by volume of nitrogen, sealed with 13.4 $\mu$mol of acetaldehyde and then irradiated with visible light from outside the vessel. The irradiation was carried out using a 500 W xenon lamp as the light source (made by USHIO INC., trade name; Optical Modulex SX-UI500XQ, lamp; UXL-500SX) equipped with an ultraviolet cutting filter (made by Asahi Techno-Glass Co., Ltd., trade name: Y-45) cutting off ultraviolet light having a wavelength of about 430 nm or shorter and an infrared cutting filter (made by USHIO INC., trade name: Supercold Filter) cutting off infrared light having a wavelength of about 830 nm or longer. When acetaldehyde is decomposed by visible light irradiation, carbon dioxide is generated due to the photocatalytic activity of the titanium oxide. The generated carbon dioxide concentration was measured with passage of time using a photoacoustic multi-gas monitor (type: 1312, made by INNOVA). Using the change of carbon dioxide concentration, the generation rate of carbon dioxide was calculated to evaluate a photocatalytic activity of the titanium oxide for acetaldehyde. A higher generation rate of carbon dioxide reveals a higher photocatalytic activity of the titanium oxide for acetaldehyde.

Example 1

90 g of a hydrated titanium oxysulfate (produced by SOEKAWA CHEMICAL Co., Ltd.) (65.9% by weight in terms of $TiOSO_4$) was dissolved in 370 g of water. Into the resulting acidic solution of titanium sulfate, was added 55 g of 1,2-propanediamine (special grade, produced by Wako Pure Chemical Industries, Ltd.) at a rate of 5 ml/min under cooling with ice while stirring at 200 rpm, to cause a reaction and obtain a slurry. (The molar amount of the utilized titanium oxysulfate was 0.37 mole, which corresponds to 0.74 of the acid equivalent. The molar amount of the utilized 1,2-propanediamine was 0.74 mole, which corresponds to 1.48 of the base equivalent.) The obtained slurry was filtered to obtain a solid, and the obtained solid was dried to obtain a powder. The obtained powder was calcined for 1 hour in nitrogen flow at 400° C. and then was calcined again for 1.5 hour in a flow of a mixed gas having 5% by volume of oxygen and 95% by volume of nitrogen at 500° C., to obtain a particulate titanium oxide.

The photocatalytic activity of the obtained titanium oxide for acetaldehyde was measured. As a result, the generation rate of carbon dioxide per 1 g of titanium oxide was 16.29 $\mu$mol/h.

Example 2

90 g of a hydrated titanium oxysulfate (produced by SOEKAWA CHEMICAL Co., Ltd.) (65.9% by weight in terms of TiOSO$_4$) was dissolved in 360 g of water. Into the resulting acidic solution of titanium sulfate, was added 117 g of pyridine (special grade, produced by Wako Pure Chemical Industries, Ltd.) at a rate of 5 ml/min under cooling with ice while stirring at 200 rpm, to cause a reaction and obtain a slurry. (The molar amount of the utilized titanium oxysulfate was 0.37 mole, which corresponds to 0.74 of the acid equivalent. The molar amount of the utilized pyridine was 1.48 mole, which corresponds to 1.48 of the base equivalent.) The obtained slurry was filtered to obtain a solid, and the obtained solid was dried to obtain a powder. The obtained powder was calcined for 1.5 hour in a flow of a mixed gas having 5% by volume of oxygen and 95% by volume of nitrogen at 500° C., to obtain a particulate titanium oxide.

The photocatalytic activity of the obtained titanium oxide for acetaldehyde was measured. As a result, the generation rate of carbon dioxide per 1 g of titanium oxide was 7.50 μmol/h.

Comparative Example 1

The photocatalytic activity of the commercially available titanium oxide (manufactured by Ishihara Sangyo Kaisha, Ltd., trade name: ST-01) for acetaldehyde was evaluated. As a result, the generation rate of carbon dioxide per 1 g of titanium oxide was 1.07 μmol/h.

What is claimed is:

1. A process for producing a titanium oxide the process comprising the steps of
    (i) mixing an acidic solution of a titanium compound with a nitrogen-containing basic organic compound at a temperature of 60° C. or lower to obtain a reaction product, wherein the nitrogen-containing basic organic compound is at least one compound selected from the group consisting of an acyclic amine, an alicyclic amine and an aromatic amine; and
    (ii) calcining the obtained reaction product.

2. A process for producing a titanium oxide according to claim 1, wherein the nitrogen-containing basic organic compound is an acyclic amine.

3. A process for producing a titanium oxide according to claim 2, wherein the acyclic amine is selected from the group consisting of primary monoamines having 1 to 10 carbon atoms, primary diamines having 1 to 10 carbon atoms, dialkylamines having 2 to 10 carbon atoms and trialkylamines having 3 to 10 carbon atoms.

4. A process for producing a titanium oxide according to claim 1, wherein calcination step (ii) is conducted at the temperature of from about 300° C. to about 600° C.

5. A process for producing a titanium oxide according to claim 1, wherein the nitrogen-containing basic organic compound is an alicyclic amine or a mixture thereof.

6. A process for producing a titanium oxide according to claim 1, wherein the nitrogen-containing basic organic compound is an aromatic amine or a mixture thereof.

7. A process for producing a titanium oxide according to claim 2, wherein the acyclic amine is selected from the group consisting of methylamine, ethylamine, n-propylamine, n-butylamine, iso-propylamine, sec-butylamine, ethyleneimine, 1,3-propanediamine, 1,2-propanediamine, dimethylamine, diethylamine, trimethylamine and triethylamine.

8. A process for producing a titanium oxide according to claim 1, wherein mixing step (i) is conducted at a temperature of 40° C. or lower.

9. A process for producing a titanium oxide according to claim 1, wherein mixing step (i) is conducted at a temperature of 10° C. or lower.

10. A process for producing a titanium oxide according to claim 1, wherein calcination step (ii) is conducted in an atmosphere having an oxygen content of about 10% by volume or less.

11. A process for producing a titanium oxide the process comprising the steps of
    (i) mixing an acidic solution of a titanium compound with a nitrogen-containing basic organic compound to obtain a reaction product, wherein the nitrogen-containing basic organic compound is at least one compound selected from the group consisting of an acyclic amine, an alicyclic amine and an aromatic amine; and
    (ii) calcining the obtained reaction product in an atmosphere having an oxygen content of about 10% by volume or less.

* * * * *